No. 640,026. Patented Dec. 26, 1899.
A. S. RAMAGE.
PROCESS OF AND APPARATUS FOR MAKING COPPERAS.
(Application filed Dec. 22, 1898.)
(No Model.)
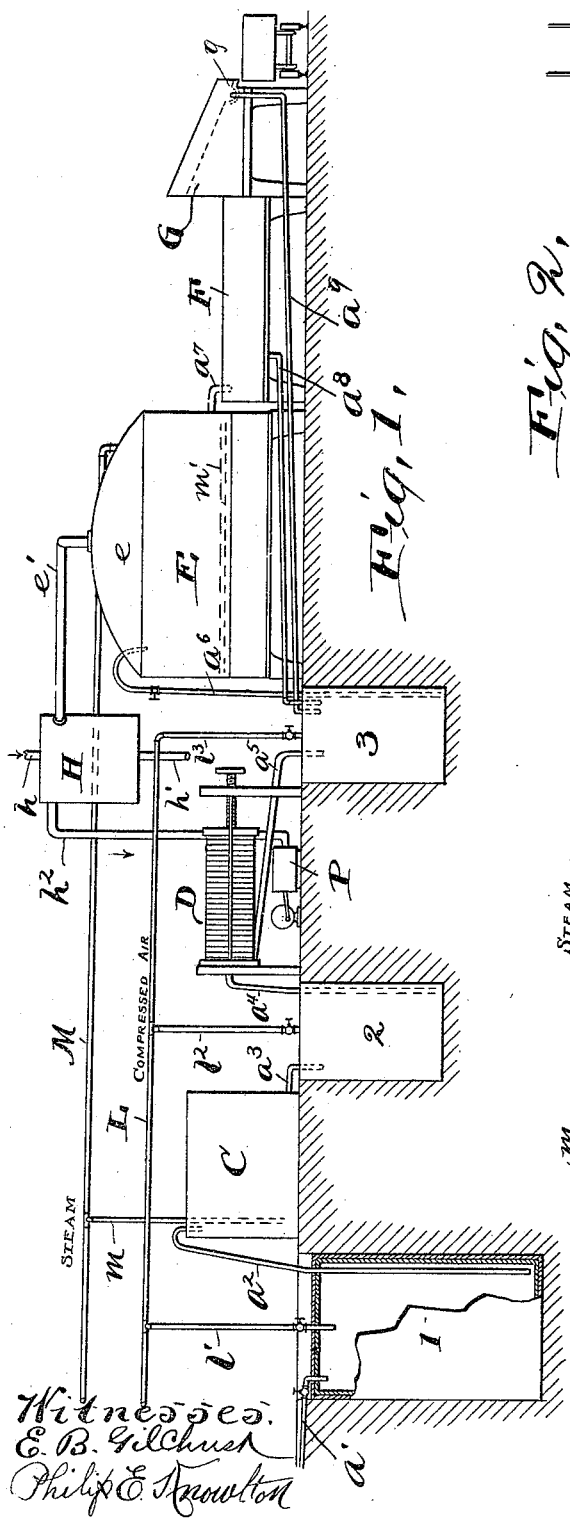
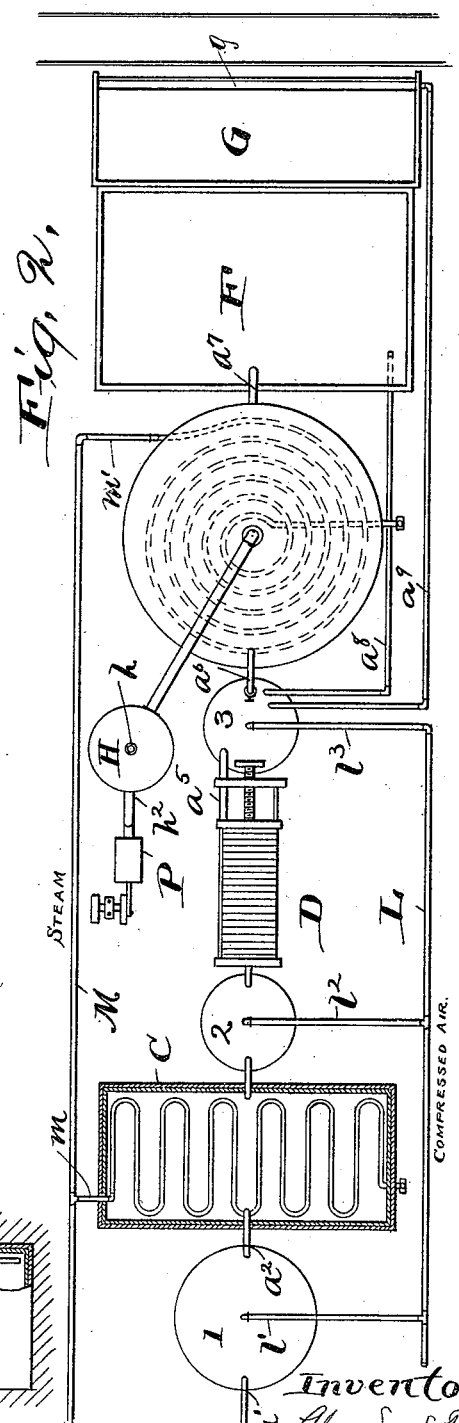
Witnesses.
E. B. Gilchrist
Philip E. Knowlton
Inventor:
Alexander S. Ramage,
By his Attorneys,
Thurston & Bates.

UNITED STATES PATENT OFFICE.

ALEXANDER S. RAMAGE, OF CLEVELAND, OHIO.

PROCESS OF AND APPARATUS FOR MAKING COPPERAS.

SPECIFICATION forming part of Letters Patent No. 640,026, dated December 26, 1899.

Application filed December 22, 1898. Serial No. 699,991. (No model.)

*To all whom it may concern:*

Be it known that I, ALEXANDER S. RAMAGE, a subject of the Queen of Great Britain and Ireland, residing at Cleveland, in the county of Cuyahoga and State of Ohio, have invented a certain new and useful Improvement in Processes of and Apparatus for Producing Commercial Copperas, of which the following is a full, clear, and exact description, reference being had to the accompanying drawings.

My invention relates to a process of producing commercial copperas, as well as to an apparatus for the working of the process which I have invented and have found efficient in practice.

If copperas be mixed with three or four per cent. of sulphate of magnesium, the magnesia does not interfere in the least with the ordinary uses of the copperas or its sale as commercial copperas, while if the copperas is calcined for the production of Venetian red the magnesia gives the product a much brighter and richer tone of color.

The object of my invention is to produce commercial copperas having this advantage and to produce it from the waste liquor or pickle of iron-works by a method which is much cheaper than that now in use for the production of copperas.

Relating to the process, the invention consists of taking a solution of sulphate of iron and free sulphuric acid, mixing the same with enough calcined magnesia or carbonate of magnesium (or other salt of magnesium which combined with the sulphuric acid will become sulphate without decomposing the sulphate of iron) to neutralize the free acid, and then treating the resulting product to get it in a dry form. I force the neutral liquor through a filter-press, which renders it free from scale or dirt. The apparatus which I have devised includes such filter-press and an artificial evaporator. It consists, broadly, of a neutralizer in which the waste pickle may be neutralized, a filter-press, an evaporator adapted to be artificially heated, a crystallizer into which the product may be run from the evaporator and suitable wells for holding the product at various stages, and means for moving the liquid into the different parts of the apparatus. The combinations of parts specified in the claims also describe wherein the apparatus essentially consists. In general I do not wish this explanation of the characteristics of my invention and the more detailed description to follow to limit me further than the claims and the prior art require.

The drawings show the apparatus I employ.

Figure 1 is a side elevation, and Fig. 2 is a plan view thereof.

The well designated No. 1 is adapted to receive from the pickling-vats of iron-works by a suitable drain-pipe $a'$ a supply of waste pickle, which consists of a solution of sulphate of iron, free sulphuric acid, and small particles of iron, dirt, and other materials. This well is lined with lead, so that the free acid may not attack the walls.

C represents a neutralizing-tank, which is also lined with lead. A pipe (designated $a^2$) extends from near the bottom of well No. 1 to the top of the neutralizer. From the bottom of the neutralizer a discharge-pipe $a^3$ empties into well No. 2. From the bottom of well No. 2 a pipe $a^4$ leads up to a filter-press D of any suitable construction. From the filter-press a discharge-pipe $a^5$ leads to well No. 3. From near the bottom of this well a pipe $a^6$ leads to the top of an evaporator E, to be more explicitly described hereinafter. From the bottom of the evaporator a discharge-pipe $a^7$ leads to the crystallizer F, while drain-pipes $a^8$ $a^9$ lead from the crystallizer and the inclined draining-board G, beyond the same, back to a suitable well, as well No. 3.

Each of the wells is a closed tank and has leading into it a branch pipe $l'$, $l^2$, or $l^3$ from the main pipe L, containing compressed air. There are suitable stop-cocks in these branch compressed-air pipes and also in the entrance-pipes to the different wells. When it is desired to force the liquid from one well into a part of the apparatus beyond the same, the entrance-pipe into the well is shut off by means of a stop-cock, and the stop-cock from the compressed-air pipe is opened and the pressure of air acting downward on the liquid in the well forces the same upward through the discharge-pipe into the next part of the apparatus. This means is employed for moving the liquid from the first well to the neutralizer, from the second well to the filter-press, and from the third well to the evaporator.

The neutralizer and evaporator are heated by steam-pipes, which are preferably two branch pipes $m$ $m'$, leading from a main steam-pipe M. After these branch pipes enter the neutralizer or evaporator they are coiled around in a suitable manner, as shown, and terminate in a steam-trap or stop-cock outside of the apparatus. When this trap is opened, the condensed steam in the coil may escape until the pipes are heated.

As the liquid is neutralized in the neutralizer, none of the succeeding apparatus need be made of any particular material with reference to withstanding the corroding action of acid, but they are made of whatever material is most suitable.

The evaporator is preferably a closed tank having the coiled steam-pipes within it, as shown. The cover of the tank is a dome $e$, from which leads a pipe $e'$, terminating in a condensing-cylinder H. Cooling-water is supplied to this cylinder by the entrance-pipe $h$ and escapes through the exhaust-pipe $h'$. The pipe $h^2$ leads to a suitable vacuum-pump P, which rarefies the air in the cylinder and evaporator, while the steam from the evaporation is condensed by the cooling-water. A suitable degree of vacuum may thus be maintained in the evaporator, increasing the efficiency and rapidity of the apparatus.

The crystallizer is an open pan having a drain-pipe $a^8$ for conveying the mother-liquor back to the last well. The drainer is a suitably-inclined platform on which the material may be thrown from the crystallizer. As shown, at the base of the drainer is a transverse trough $g$, which leads by the pipe $a^9$ back to the last well. Beyond the drainer is preferably a car-track, so that the product may be conveniently shoveled directly into a car.

In the operation of my process and apparatus, well No. 1 is filled with waste solution from the pickling-vat. A suitable amount of this is then forced by the compressed air in the pipe $l'$ into the neutralizer, where it is mixed with three per cent. or four per cent. (or quantity requisite to neutralize the free acid) of magnesium carbonate, calcined magnesite, dolomite, or some other form of magnesia which will make a magnesium sulphate with free sulphuric acid, but will not decompose the sulphate of iron. The salt of magnesia supplied thus operates to take up all the free sulphuric acid. From the neutralizer the neutral liquid passes to well No. 2 and is forced therefrom by the air in the pipe $l^2$ through the filter-press, the purified liquid passing into well No. 3. From well No. 3 it is forced by the air in pipe $l^3$ into the evaporator, where it is evaporated above the point of crystallization. When it reaches this state, it is run out into the crystallizing-pan and allowed to crystallize. From the crystallizing-pan it is thrown up by a shovel on the draining-board or drainer and when it is sufficiently dry is removed from the drainer into any form of vehicle desired.

If I did not filter the liquor, the foreign matter and dirt would deposit on the sides and bottom of the crystallizer and give me what is known as "bottom-salts," which is of little value, whereas I now obtain a perfectly clean copperas.

As stated, the magnesium sulphate in the product increases the value for the purpose of making Venetian red and does not in the least interfere with its other uses as commercial copperas.

Having described my invention, I claim—

1. The process of making commercial copperas from liquor containing sulphate of iron and free sulphuric acid which consists in neutralizing the free acid by the addition of a form of magnesia which will make magnesium sulphate with the free acid, but will not decompose the sulphate of iron, and evaporating the resulting liquid.

2. The process of producing commercial copperas from the waste liquor of pickling-vats, which consists in adding to the liquor a form of magnesia which will make magnesium sulphate with the free sulphuric acid, but will not decompose the iron sulphate in the pickle, then filtering the resulting liquid, then evaporating the clarified liquid by means of heat to a point beyond its point of crystallization, then allowing it to crystallize.

3. The process of producing commercial copperas from the waste liquor of pickling-vats which consists in adding to that liquor enough carbonate of magnesium to neutralize the free sulphuric acid, then filtering the resulting product, then evaporating by the application of heat the clarified liquid from the filtering-press, then allowing the evaporated mass to crystallize.

4. An apparatus for the production of commercial copperas consisting of a neutralizing-tank, a filter-press, an evaporator, and a well between the neutralizing-tank and filter-press, and a well between the filter-press and evaporator, and means for discharging the liquid from the neutralizing-tank and filter-press into these wells respectively, and from these wells respectively into the filter-press and evaporator, substantially as described.

5. In an apparatus for the production of commercial copperas, a neutralizing-tank, a filter-press, and an evaporator, and intermediate containers through which the liquid may pass from the neutralizer to the filter-press and from the filter-press to the evaporator, in combination with a system of compressed-air pipes leading to said intermediate containers and operating to cause the flow of the liquid toward the evaporator, substantially as described.

6. In combination, a neutralizing-tank, a filter-press, an evaporator, a well preceding the neutralizer and adapted to receive waste liquor from a pickling-vat, a well interposed between the neutralizer and filter-press, and a well interposed between the filter-press and the evaporator, a pipe leading from each of these wells to the parts of the apparatus following, a compressed-air pipe having a branch pipe leading to each well, and suitable cocks or valves in said branch pipes whereby the liquid may be forced individually from each well into the portion of the apparatus following it, substantially as described.

7. The combination, with a neutralizing-tank, a filter-press and an evaporator, of three wells 1, 2, 3, pipes leading from said wells respectively to the neutralizing-tank, the filter-press and the evaporator, and exit-passages from the neutralizing-tank and the filter-press respectively to said wells 2 and 3, a main compressed-air pipe L, branch pipes $l'$, $l^2$, $l^3$, leading respectively to the wells 1, 2 and 3, a cock or valve in each branch pipe, a steam-pipe and coils connected with it in the neutralizing-tank and in the evaporator, substantially as described.

8. The combination of a neutralizing-tank C, a well 2, a filter-press D, a well 3, an evaporator E, a crystallizer F, a draining-board G, all connected in series whereby the material may pass from one to the other in the order named, a draining-pipe leading from the crystallizer to a well connected with the evaporator, means for heating said neutralizing-tank and evaporator, and compressed-air pipes leading to said wells whereby the air in said pipe may force the liquid to the part of the apparatus beyond the wall, substantially as described.

In testimony whereof I hereunto affix my signature in the presence of two witnesses.

ALEXANDER S. RAMAGE.

Witnesses:
W. S. ROGERS,
PHILIP E. KNOWLTON.